Oct. 27, 1931.  J. L. DRAKE  1,828,833
GLASS MELTING FURNACE
Filed Dec. 6, 1926
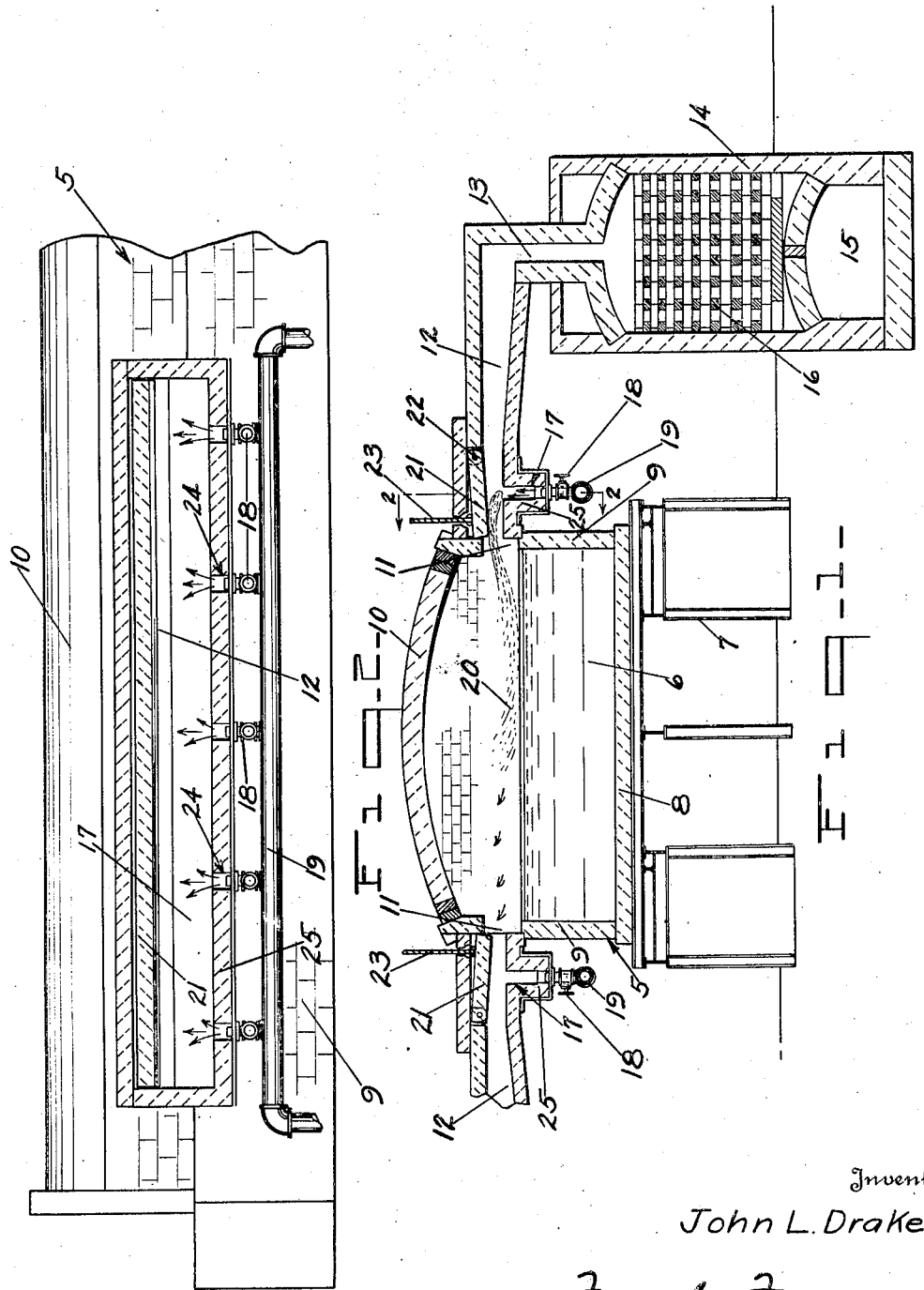
Inventor
John L. Drake
By Frank Fraser
Attorney Patented Oct. 27, 1931

1,828,833

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

GLASS MELTING FURNACE

Application filed December 6, 1926. Serial No. 152,759.

This invention relates to glass melting furnaces and more particularly to improved and efficient means for supplying heat thereto.

An important object of this invention is to provide a glass melting furnace including means for varying the effective size of the port or opening through which the gas and air enter the same, also to similar means for varying the effective size of the outlet port.

Another object of the invention is the provision of improved means for delivering the gas and air to the furnace in the inlet port in such a manner that the resultant flame may be given a more effective shape for efficiently and uniformly melting the glass batch.

A further object of the invention is to provide, in a glass melting furnace, means for creating over the glass or glass producing materials a flat sheet of flame which is adapted to cover a relatively large area thereof.

A further object of the invention is to provide, in a glass melting furnace, means for creating a single, flat, wide and continuous unbroken sheet of flame over substantially the entire area of the melting zone.

A still further object of the invention is to provide, in a glass melting furnace, a melting tank having a longitudinally extending port therein, and means for creating a flame having substantially a longitudinal continuity equal to the length of said port.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical transverse section through approximately one half of an improved glass melting furnace constructed in accordance with the present invention, and Fig. 2 is a section taken on line 2—2 of Fig. 1.

The furnace and regenerator installation disclosed herein comprises a melting tank 5 containing a pool of molten glass 6 and being mounted on any suitable supporting structure such as indicated at 7. The tank 5 comprises a bottom 8 having side walls 9 extending upwardly therefrom and a cover arch 10. Formed in the side walls 9 just above the level of the molten glass 6 are a pair of oppositely disposed ports 11, each of which consists of a single horizontal slot extending longitudinally of the melting tank 5 and preferably though not necessarily substantially the entire length of the melting zone thereof.

Communicating with each port 11 by means of the passages 12 and 13 is a regenerator 14, the passage 12 thereof being in direct communication with the port 11 and being of a width substantially equal to the length thereof. The air is drawn in through the tunnel 15 and after passing upwardly through the heated checker-work 16 and passages 12 and 13 is delivered through the port 11 into the furnace chamber above the molten glass 6 or glass producing materials therein.

Also communicating with the furnace ports 11 by means of vertical passages 17 are a plurality of gas valves 18 which are tapped off from the main gas supply line 19. The vertical passages 17 extend longitudinally of the furnace the entire width of the passages 12 and the gas valves 18 communicating with each passage extend upwardly through openings 24 in the bottom wall of the gas box 25. The gas as it is fed into the passage 12 adjacent the port 11 unites with the heated air at the said port to form the fire which melts the glass producing materials. Inasmuch as the passage 12 and port 11 extend longitudinally of the melting tank 5 and substantially the entire length thereof, the gas uniting with the heated air at the port 11 will form a single, wide and flat unbroken sheet of flame 20 which is thrown over and plays across substantially the entire area of the melting zone of the furnace. Such a flame as described, which will spread out over a wide surface will exert a more uniform melting effect over a relatively large area than will a plurality of separate independent flames playing at different points throughout the length of the melting zone as is the case in certain types of furnaces now in use.

By the provision of the valves 18, the velocity and intensity of the flame entering the furnace can be effectively controlled and the intensity of the flame at different points throughout its width can be varied by proper regulation of the valves 18. For instance, it will be appreciated that upon opening the valves at one end of the melting zone and partially closing the valves at the opposite end thereof, the intensity of the flame at the the end of the furnace where the valves have been opened will be greater than at the opposite end thereof. Thus, if desired, the flame can be progressively tapered from one end to the opposite end of the melting zone by proper operation of the valves 18 or the flame can taper from the center of the melting zone towards the opposite ends thereof.

The firing apparatus on the side of the furnace not completely shown which cooperates with and is identical with the one shown firing is in open communication with a stack remote from the furnace. Within the stack a draft is created of sufficient magnitude to draw air from the tunnel 15 through the heated checker-work 16 in the regenerator 14 and the passages 12 and 13. The burnt heated gases produced by the combustion of the air and raw gases are drawn across the tank by the draft created in the stack and drawn through the regenerator at the opposite side of the furnace, heating the checker-work therein and passing out through the stack. At intervals, the direction of fire is reversed so the side of the furnace shown in Fig. 1 as firing, will function in the same manner as its cooperating opposite side now does when the firing is reversed so that the checker-works will be alternately heated and cooled.

The present invention also embodies improved means for varying the effective size of the slots or ports 11 through which the flame enters and the burnt gases leave the furnace.

Since the waste gases and products of combustion have a larger bulk than the fuel gases fed to the furnace, the draft through the stack will operate more effectively if the exit port is of larger cross-section of capacity than the inlet port. However, since the opposite pair of ports have their functions reversed at short intervals, that is, they serve alternately as inlet and exit ports for the gases, these ports cannot be given the fixed dimensions noted above, but should be capable of having their size varied according to the purpose they are being used for at the time. Furthermore, the most effective size of inlet ports will vary according to the type and proportions of the furnace or tank with which they are used, and it is also desirable to adjust this size at times to meet varying conditions in the same tank.

To satisfy the above requirements in the furnace here shown, a portion of one wall of each inlet passage 12 is made movable so that the inlet port may be more or less cut off and the effective size of the inlet passage varied as desired. In the example here shown, an inner or auxiliary roof portion 21 is swung from hinges 22 at its rear end so that the forward end thereof may be dropped downwardly, thereby giving any desired inclination to the roof of the passage for regulating the effective size of the port. Moreover, by adjusting the hinged roof sections 21, the angle at which the flame enters the furnace relative to the glass or glass producing materials can be varied and controlled as desired. These auxiliary roof portions 21 are adapted to be raised or lowered in any preferred manner such as by means of cables or rods 23.

The swinging roof members 21 are not only useful in changing the size of the regenerator ports when their function is reversed from inlet to outlet ports or vice-versa, but are also useful in determining the most effective size of inlet or outlet ports for use with a new design of furnace. It is only possible, in advance, to calculate approximately the most desirable proportions for these ports, and it is a very slow and expensive process to rebuild these ports to try out different proportions for these passages after the tank is once in operation. If hinged roof sections, as shown at 21, are installed in the furnace, the size of the ports may be varied at will until the most effective passages are obtained. The sections 21 may be then fixed more or less permanently in this position if desired, and will serve as models for permanently designed regenerator passages in another tank of the same design and proportions.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In a glass melting furnace, an elongated melting tank of greater length than width and being provided with oppositely disposed longitudinally extending ports in the side walls thereof, cooperative regenerators at the sides of the tank having substantially horizontal air passages communicating with the respective ports and being of a width substantially equal to the length thereof, a gas box positioned beneath each horizontal air passage and being in communication therewith the entire width of said horizontal passage, each gas box being provided with a plurality of spaced openings in its bottom wall, a gas pipe positioned beneath the gas box and extending longitudinally thereof and having a plurality of outlets in communication with the respective openings, and separate means for independently controlling the supply of gas to each opening.

2. In a glass melting furnace, an elongated melting tank of greater length than width and being provided with oppositely disposed longitudinally extending ports in the side walls thereof, cooperative regenerators at the sides of the tank having substantially horizontal air passages communicating with the respective ports and being of a width substantially equal to the length thereof, a gas box positioned beneath each horizontal air passage and being in communication therewith the entire width of said horizontal passage, each gas box being provided with a plurality of spaced openings in its bottom wall, a gas pipe positioned beneath the gas box and extending longitudinally thereof and having a plurality of outlets in communication with the respective openings, separate means for independently controlling the supply of gas to each opening, and an auxiliary roof portion pivotally mounted within each horizontal passage above the corresponding gas box for controlling the effective opening of the port and for directing the heating flame therethrough.

Signed at Toledo, in the county of Lucas and State of Ohio, this 3rd day of December, 1926.

JOHN L. DRAKE.